(12) United States Patent
Allen

(10) Patent No.: US 8,386,294 B2
(45) Date of Patent: Feb. 26, 2013

(54) SPECIFIED BUSINESS FUNCTION SCORING TOOL

(75) Inventor: Julian Allen, Surrey (GB)

(73) Assignee: Accenture Global Services Limited, Dublin (IE)

( * ) Notice: Subject to any disclaimer, the term of this patent is extended or adjusted under 35 U.S.C. 154(b) by 265 days.

(21) Appl. No.: 12/829,199

(22) Filed: Jul. 1, 2010

(65) Prior Publication Data

US 2012/0004939 A1    Jan. 5, 2012

(51) Int. Cl.
*G06Q 10/00* (2012.01)
(52) U.S. Cl. ............. 705/7.29; 705/7.11; 705/7.35; 705/7.36; 705/7.38
(58) Field of Classification Search ............. 705/7.11, 705/7.29, 7.35, 7.36, 7.38
See application file for complete search history.

(56) References Cited

U.S. PATENT DOCUMENTS

| | | | |
|---|---|---|---|
| 7,640,196 B2* | 12/2009 | Weiss | 705/35 |
| 2003/0008696 A1* | 1/2003 | Abecassis et al. | 463/9 |
| 2004/0133342 A1* | 7/2004 | Banker | 701/200 |
| 2006/0247943 A1* | 11/2006 | Kapoor | 705/1 |
| 2008/0097885 A1* | 4/2008 | Schneider | 705/36 R |
| 2008/0288416 A1* | 11/2008 | Arnott et al. | 705/36 R |

OTHER PUBLICATIONS

Hines, James R, Jr. Altered States: Taxes and the Location of Foreign Direct Investment in America. Working Paper 4397, National Bureau of Economic Research, Cambridge, MA. Jul. 1993.*

Lipsey, Robert E. Foreign Direct Investment and the Operations of Multinational Firms: Concepts, History, and Data. Working Paper 8665, National Bureau of Economic Research, Cambridge, MA. Dec. 2001.*

Ye Chen, Xin Su, Keither Hipel. An Index Aggregation Approach to Comparing the Overall Performance of Emerging and Developed Countries. Department of Systems Design Engineering, Waterloo, Ontario Canada M5SIV6, Available Online Mar. 15, 2008.*

Goodnow, James and Hansz, James. Environmental Determinants of Overseas Market Entry Strategies. Journal of International Business Studies, vol. 3, No. 1, Spring, 1972, pp. 33-50.*

Groh, Alexander Peter and Wich, Matthias. A Composite Measure to Determine a Host Country's Attractiveness for Foreign Direct Investment. Working Paper IESE Business School, University of Navarra. Nov. 2009.*

"fDi Benchmark: Corporate Location Benchmarking Tool", fDi Markets Newswire, downloaded Jun. 21, 2010.

* cited by examiner

*Primary Examiner* — Jonathan G Sterrett
*Assistant Examiner* — Stephanie Delich
(74) *Attorney, Agent, or Firm* — Mannava & Kang, P.C.

(57) ABSTRACT

A system for determining a level of optimality for countries in which to perform a specified business function includes a data storage unit, a mapping engine and a mapping generator. The data storage stores a composite business environment index, a composite input resources index, and an innovation index. The mapping engine receives the specified business function and input factors related to the specified business function and selects at least two of the composite business environment index, the composite input resources index, and the innovation index based on the input factors. The matrix generator determines the level of optimality indicating a measure of success in achieving the specified business function for each of the countries based on scores in the at least two selected indices.

15 Claims, 11 Drawing Sheets

| | 110a<br>MPW<br>TALENT<br>INDEX<br>OUT OF 60 | 112<br>MPW<br>CAPITAL-NON-<br>CORRUPTION INDEX<br>OUT OF 60 | 110b<br>MPW<br>NATURAL RESOURCES<br>INDEX<br>OUT OF 60 | 113<br>COMPOSITE<br>INPUT RESOURCES<br>INDEX<br>OUT OF 180 |
|---|---|---|---|---|
| ARGENTINA | 39 | 49 | 32 | 120 |
| BRAZIL | 57 | 48 | 26 | 131 |
| CHINA | 6 | 11 | 52 | 69 |
| INDIA | 2 | 34 | 57 | 93 |
| INDONESIA | 44 | 52 | 50 | 146 |
| MALAYSIA | 5 | 22 | 25 | 52 |
| MEXICO | 26 | 56 | 34 | 116 |
| NIGERIA | 49 | 44 | 53 | 146 |
| PHILIPPINES | 41 | 37 | 23 | 101 |
| POLAND | 43 | 36 | 41 | 120 |
| RUSSIA | 20 | 38 | 51 | 109 |
| S AFRICA | 55 | 57 | 42 | 154 |
| S KOREA | 10 | 43 | 54 | 107 |
| SINGAPORE | 13 | 4 | 10 | 27 |
| TURKEY | 54 | 47 | 43 | 144 |
| VIETNAM | 42 | 17 | 55 | 114 |

FIG. 4

| | COMPOSITE BUSINESS ENVIRONMENT INDEX 114 | COMPOSITE INPUT RESOURCES INDEX 113 |
|---|---|---|
| | RANK OUT OF 120 | RANK OUT OF 180 |
| ARGENTINA | 95 | 120 |
| BRAZIL | 94 | 131 |
| CHINA | 82 | 69 |
| INDIA | 101 | 93 |
| INDONESIA | 105 | 145 |
| MALAYSIA | 44 | 52 |
| MEXICO | 73 | 116 |
| NIGERIA | 101 | 146 |
| PHILIPPINES | 112 | 101 |
| POLAND | 74 | 120 |
| RUSSIA | 108 | 109 |
| S AFRICA | 56 | 154 |
| S KOREA | 44 | 107 |
| SINGAPORE | 4 | 27 |
| TURKEY | 70 | 144 |
| VIETNAM | 95 | 114 |

COUNTRY ATTRACTIVENESS MATRIX 150

| | | COMPOSITE INPUT RESOURCES INDEX 113 | | |
|---|---|---|---|---|
| | | LOW | AVERAGE | HIGH |
| COMPOSITE BUSINESS ENVIRONMENT INDEX 114 | GOOD | | S KOREA | MALAYSIA SINGAPORE |
| | AVERAGE | S AFRICA TURKEY | MEXICO POLAND | CHINA |
| | POOR | INDONESIA NIGERIA | ARGENTINA BRAZIL INDIA PHILIPPINES RUSSIA VIETNAM | |

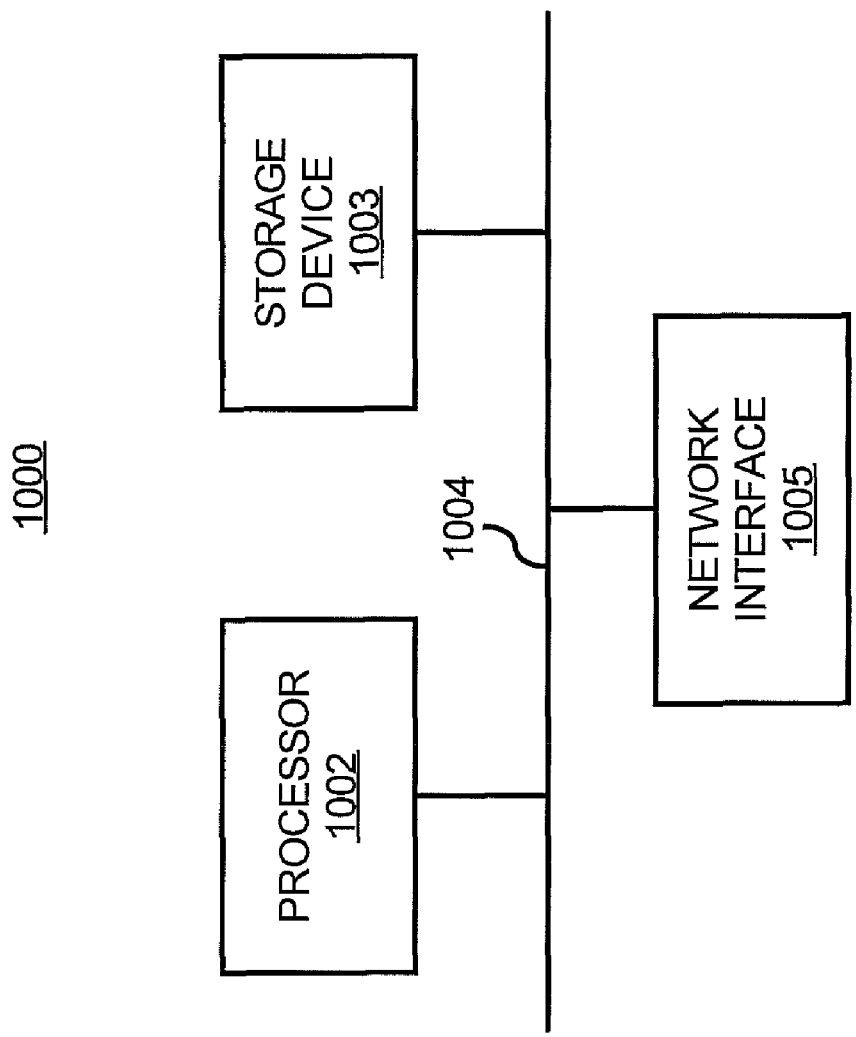

US 8,386,294 B2

SPECIFIED BUSINESS FUNCTION SCORING TOOL

BACKGROUND

Companies attempting to grow their business across borders require effective tools to analyze relevant regional economic data. Many data sources are available that provide country-specific information related to business. For example, the Multi-Polar World Index (MPW Index) is a data source provided by Accenture™. The MPW Index provides information on a country's competitiveness within five dimensions, including talent, capital, resources, consumers and innovation. Other data sources may be publicly available that provide similar information. However, the MPW Index and other data sources contain a large amount of data, only some of which may be relevant to determining whether a company should grow their business in a specific market. For example, a company wishing to expand their pharmaceutical manufacturing business into Malaysia or South Korea needs to determine the likelihood of future success in those countries before deciding whether to expand into those markets. The data sources may provide some information about Malaysia and South Korea. However, the data may not be exactly relevant to the pharmaceutical manufacturing business. Moreover, it is difficult to determine which data is relevant because there is no way to simplify and summarize the relevant data in these indices. Also, it is difficult to analyze the relevant regional, country and economic data for a specific business goal because of the large amount of data present in these indices.

SUMMARY

A system for determining a level of optimality for countries in which to perform a specified business function includes a data storage storing a composite business environment index, a composite input resources index, and an innovation index. A mapping engine receives the specified business function and input factors related to the specified business function and selects at least two of the composite business environment index, the composite input resources index, and the innovation index based on the input factors. A matrix generator determines, using a processor, the level of optimality for each of the countries based on scores in the at least two selected indices, wherein the level of optimality indicates a measure of success in achieving the specified business function.

A method for determining a level of optimality for countries in which to perform a specified business function includes determining the specified business function; determining input factors related to the specified business function; creating a composite business environment index from a business index describing ease of doing business in countries and a corruption index describing corruption in the countries; creating a composite input resources index from a talent index, natural resources index, and a capital index; selecting at least two of the composite business environment index, the composite input resources index, and the innovation index based on the input factors; and determining, using a processor, the level of optimality for each of the countries based on the scores in the selected indices, wherein the level of optimality indicates a measure of success in achieving the specified business function. The composite business environment index may include a business environment score for each of the countries, and the composite input resources index may include a resources score for each of the countries. The method may be embodied in a computer program stored on a computer readable medium.

BRIEF DESCRIPTION OF DRAWINGS

The embodiments of the invention will be described in detail in the following description with reference to the following figures.

FIG. 4 illustrates an example of creating a composite index, according to an embodiment;

FIG. 8a illustrates an example of rankings in indices, according to an embodiment;

FIG. 8b illustrates an example of a country attractiveness matrix, according to an embodiment;

FIG. 10 illustrates a computer system, according to an embodiment.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

An emerging markets scoring tool, according to an embodiment of the invention, determines and analyzes relevant regional, country and economic data for a specific business goal or business function. The emerging markets scoring tool allows a company to predict or estimate the future success of a business in several emerging markets and allows a company to select an emerging market for expansion in which the company is likely to succeed. Moreover, the emerging markets scoring tool provides a unique perspective of the emerging markets and provides an understanding of where potential may lie under a range of possible economic scenarios for specific businesses, stages of business and business functions.

The emerging markets scoring tool combines economic scenarios, a country segmentation based on a range of indices (e.g., corruption, mineral wealth, fiscal controls, etc.) and business focused approach to provide the new perspective of the emerging markets to ultimately advise businesses on their approach to investments and sales in those geographies. Indices include data in any format. The emerging markets scoring tool enables combinations of various data sets and efficient data retrieval for a specific business function. Thus, data from several sources may be combined to enable a company to select an emerging market for expansion in which the company is likely to succeed.

Figure 1:
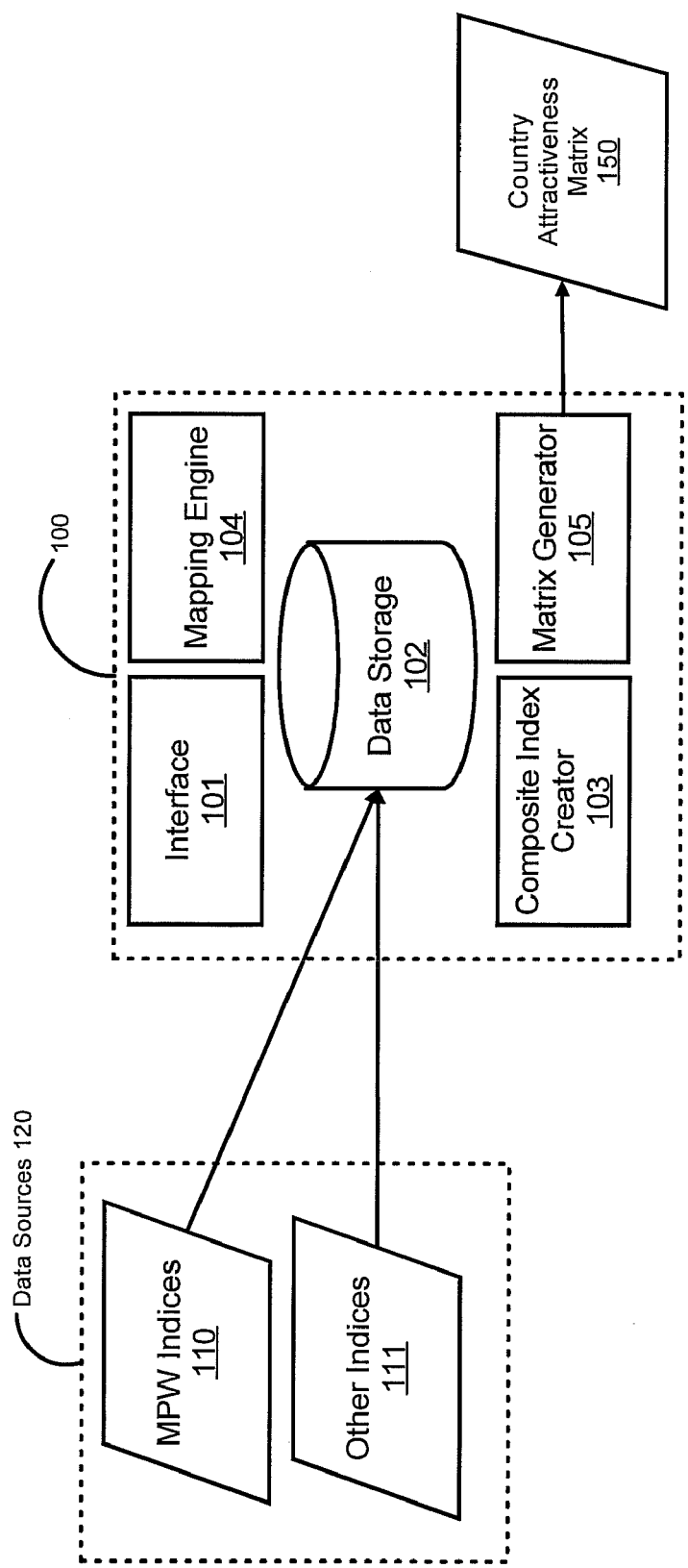
FIG. 1 illustrates a system, according to an embodiment.

FIG. 1 illustrates an emerging markets scoring system 100, according to an embodiment. The emerging markets scoring system 100 includes interface 101, data storage 102, composite index creator 103, mapping engine 104 and matrix generator 105. An index as used herein may include data any format.

The data storage 102 includes a data storage device that stores data organized in a manner that allows desired data to be easily retrieved such as data sources 120 including MPW indices 110 and other indices 111 explained further below. For example, the data storage 102 may include a relational database, or be part of an online analytical processing (OLAP) system for retrieving data, or include another type of platform providing similar functionality.

The interface 101 of the emerging markets scoring system 100 may be a user interface, such as a graphical user interface (GUI), that allows users to input or select a specified business function. A specified business function is a set of actions an entity desires to perform in a specific location, such as a particular country. The specified business function may be related to starting a business unit of the entity, such as research and development (R&D), manufacturing, sales or outsourcing, in the specific location. Once the user selects the specified business function, the user also selects input factors related to the specified business function through the interface 101. The input factors related to the specific business function, for example, are business requirements. For example, if an R&D specified business function is chosen, a list of input factors related to the R&D specified business function may include a location supported for innovation, government incentives, skilled work force, infrastructure, etc.

The composite index creator 103 creates the composite indices as further explained below. The mapping engine 104 receives the specified business function and input factors. In one embodiment, the mapping engine 104 determines which of the indices in the data storage 102 map to the input factors by mapping each of the input factors to a relevant metric in one of the indices in the data storage 102. Once the mapping engine 104 maps the input factors to the relevant metrics in order to analyze the relevant regional, country and economic data for the specified business function, at least two indices from the data storage 120 that have the highest number of input factors mapped to its metrics are selected to create a country attractiveness matrix 150. These two selected indices, specified business function and input factors are then provided to the matrix generator 105. For example, a user has selected the R&D business function and selected a list of input factors related to the R&D business function including a location supported for innovation, government incentives, skilled work force, and infrastructure. The mapping engine 104 maps each of these input factors to a relevant metric in the indices. The mapping engine 104, based on the mapping, determines which two indices have the highest number of metrics that have been mapped to input factors. For the example, the mapping engine 104 may determine that the two indices are a composite business environment index and an innovation index. In another embodiment, the user may select the two relevant indices through interface 101. The mapping engine 104 may then receive the user selections and forward the specified business function, the input factors related to the specified business function and the two relevant indices to the matrix generator 105.

The matrix generator 105 receives the specified business function, input factors related to the specified business function and the two relevant indices from the mapping engine 104 and based on these inputs, creates the country attractiveness matrix 150. The country attractiveness matrix 150 is a 3×3 matrix mapping two values for each country from two indices. For example, if the mapping engine 104 determined that the composite business environment index and the composite input resources index are to be provided to the matrix generator 105, the matrix generator 105 creates the country attractiveness matrix 150 based on a first value for each country in the composite business environment index, also called a business environment score, and a second value for each country in the composite input resources index, also called a resources score. A matrix can be any representation of the data calculated and produced by matrix generator 105 including graphs, charts, tables, a 2×2 array, etc. The creation of the country attractiveness matrix 150 is explained further below.

The data storage 102 stores information from the data sources 120. The data sources 120 may be public or private data sources generated by different organizations, governments, or companies. The data sources 120 may include a multitude of sub-indices that are each composed of a number of metrics. The sub-indices include data in any format. The sub-indices may include multiple MPW indices 110 as well as other indices 111. In one embodiment, at least five MPW indices, including an MPW Natural Resources Index, an MPW Capital Index, an MPW Talent Index, an MPW Innovation Index and an MPW Consumer Index, are stored in the data storage 102 and used to generate the country attractiveness matrix 150, which is further described below. The MPW Natural Resources Index is a measure of a country's access to and use of natural resources. The MPW Capital Index is a measure of a country's foreign direct investment flows and capital markets. The MPW Talent Index is a measure of the attractiveness of a country's talent pool. The MPW Innovation Index is a measure of a country's environment for creating innovation and its success at creating innovations. The MPW Consumer Index is a measure of a country's consumer markets. The MPW Index includes other indices not described herein that may be used to generate the country attractiveness matrix 150. Note that a sub-index as used herein is an index used to generate another index. Also, each index may include at least one country and at least one metric for each country. Also, note that the specific indices described herein are meant to illustrate an example of the types of data that may be used determine a level of optimality indicating a measure of success in achieving a specified business function in each country. Other indices and types of data relevant to each country may be used to determine the level of optimality.

In the MPW indices, each metric contained within an MPW index is scored across the same sixty countries and includes a ranking for each of the sixty countries based on the scoring of the metrics. Updates to these indices can be retrieved or downloaded periodically from third-party sources.

The data storage 102 may store other sub-indices 111, each of which are composed of any number of metrics. These sub-indices may include the World Bank Ease of Doing Business Index and the Transparency International's Corruption Perception Index. In these indices, each metric is scored across a variable number of countries and includes a ranking for each of the countries based on the scoring of the metrics. Updates to these indices can also be retrieved or downloaded periodically.

Figure 2:
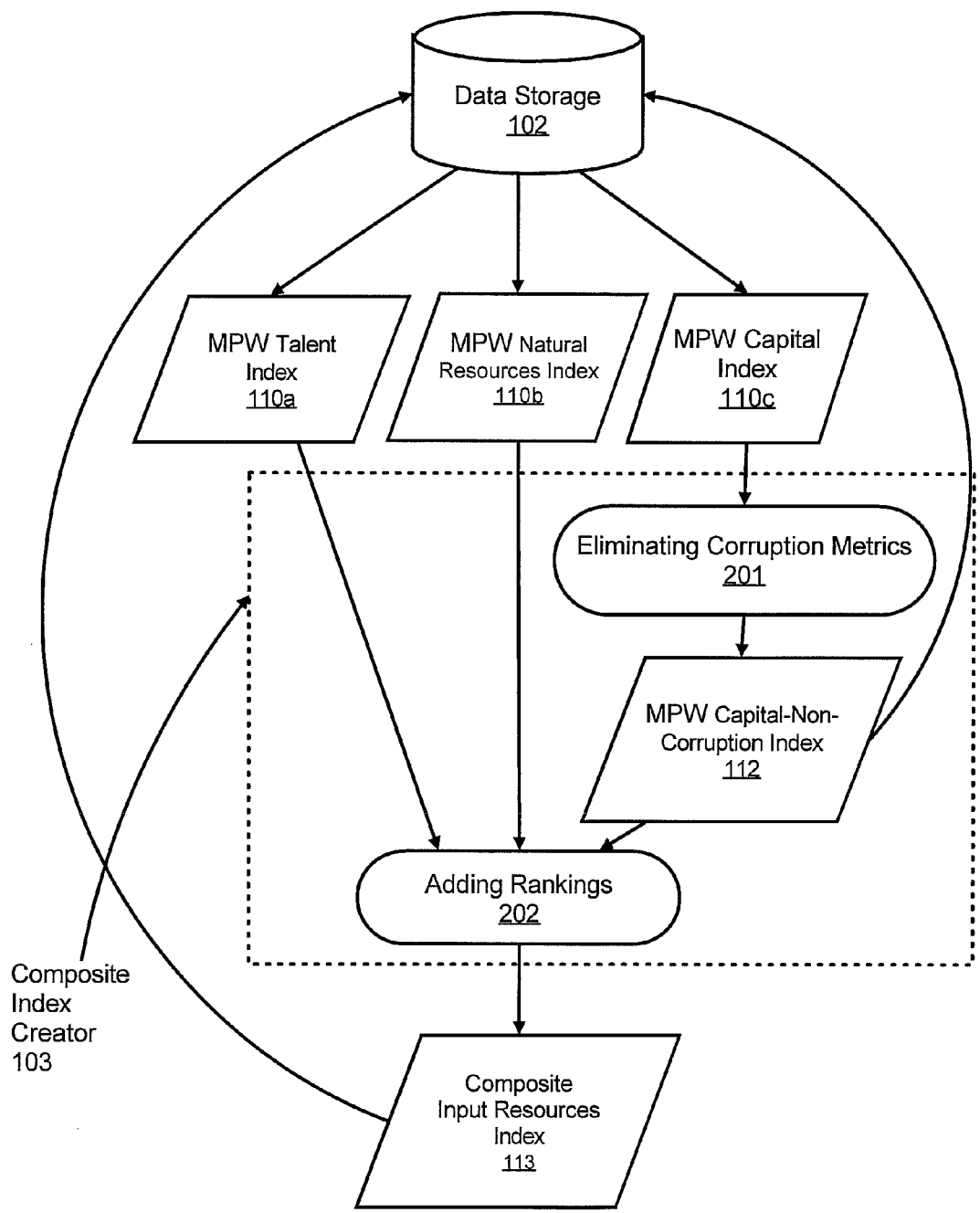
FIG. 2 illustrates a data flow diagram, according to an embodiment.
Figure 3:
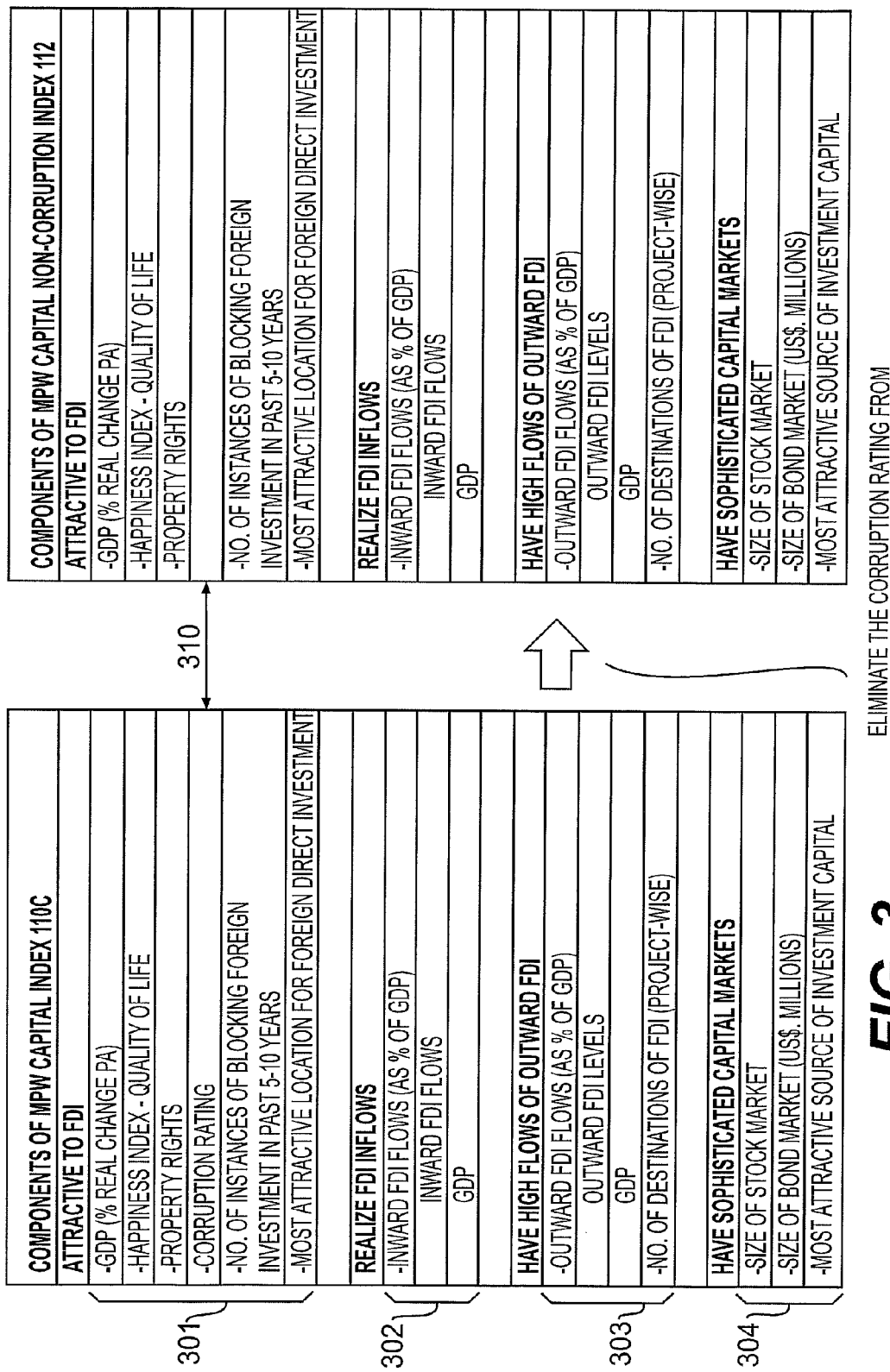
FIG. 3 illustrates an example of the elimination of corruption metrics from an index, according to an embodiment.
Figure 5:
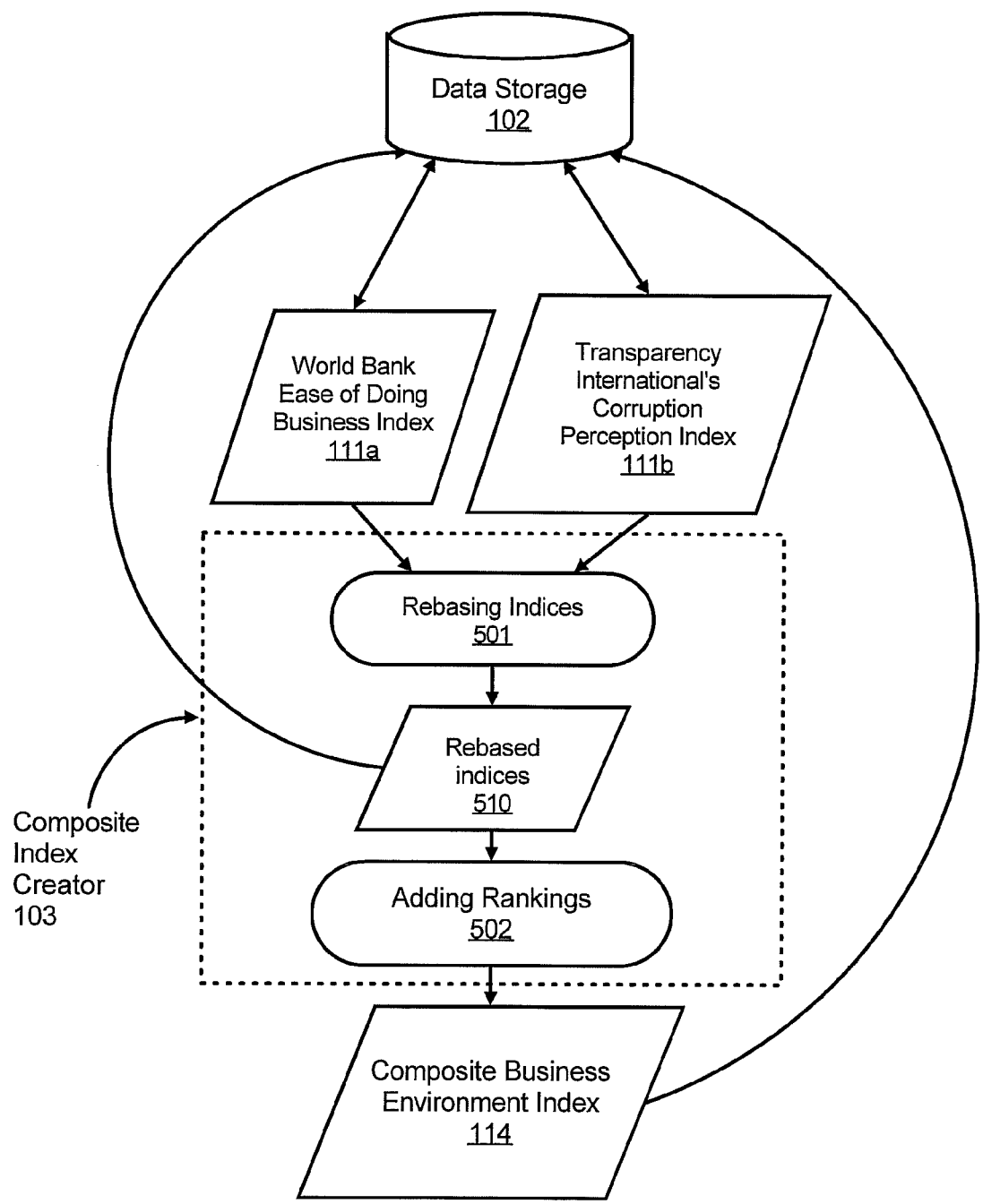
FIG. 5 illustrates a data flow diagram, according to an embodiment.
Figure 6:
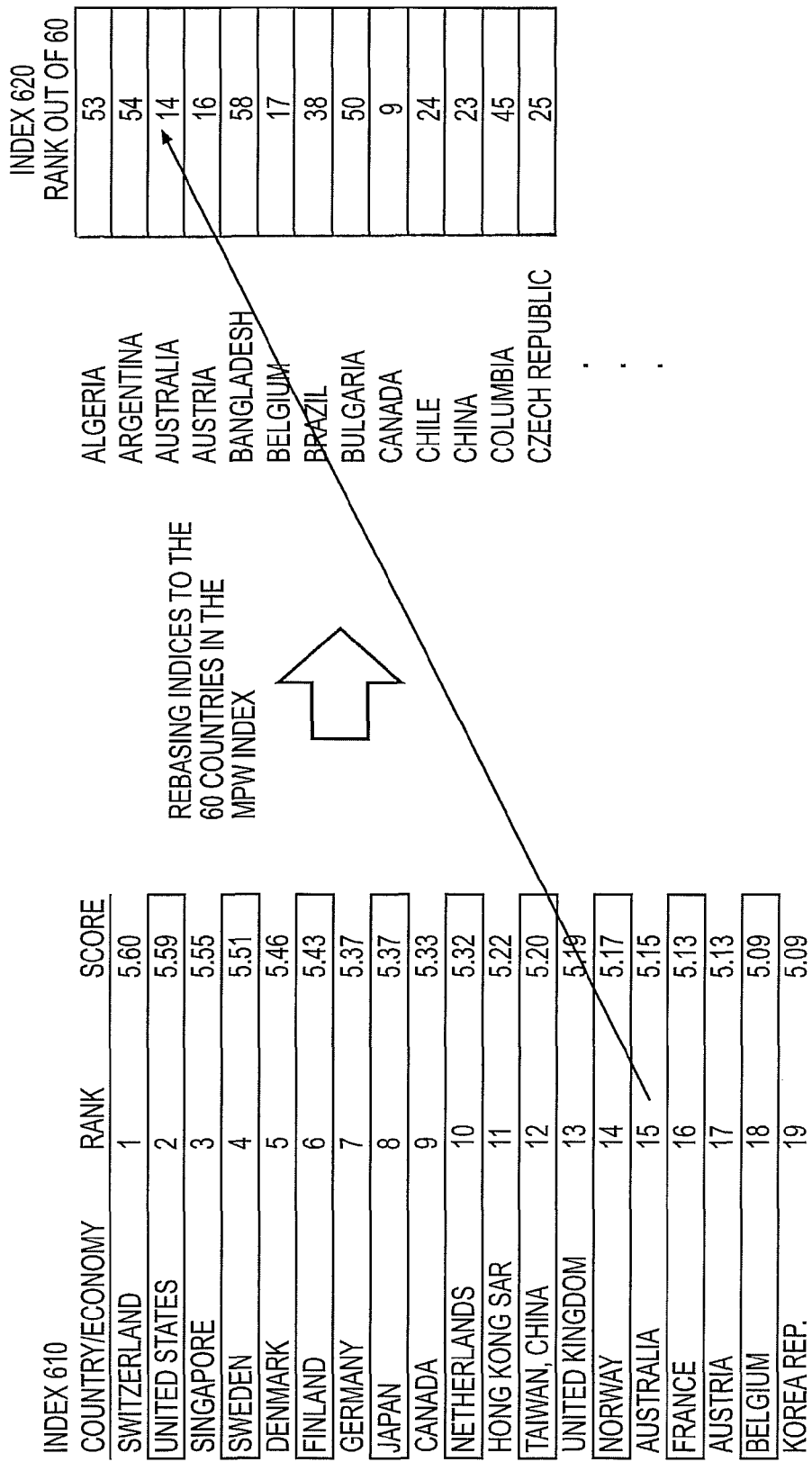
FIG. 6 illustrates an example of rebasing an index, according to an embodiment.
Figure 7:
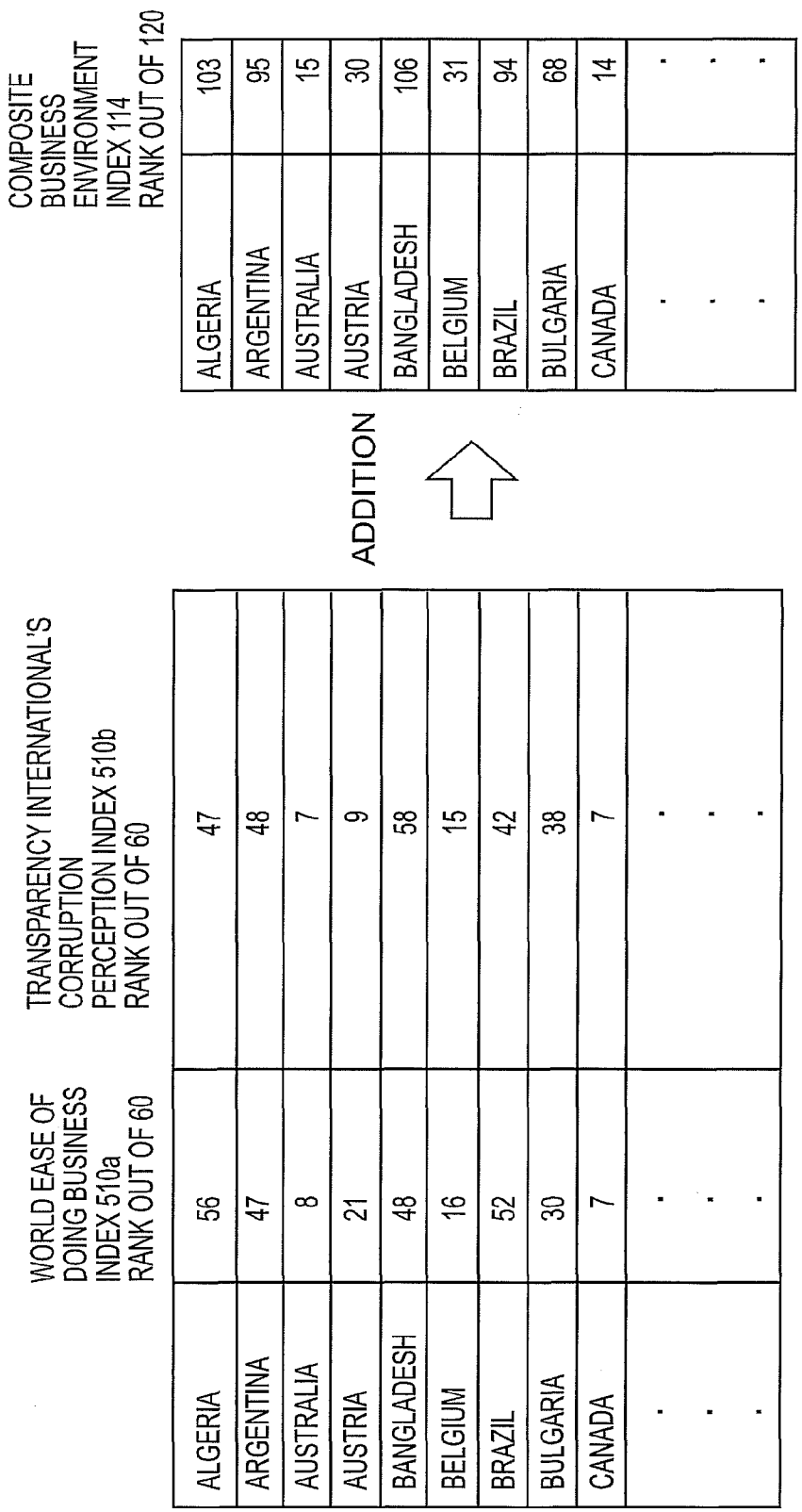
FIG. 7 illustrates an example of creating a composite index, according to an embodiment.

The data storage 102 also stores composite indices including at least a composite input resources index 113 and a composite business environment index 114. The composite index creator 103 creates the composite indices from the various sub-indices stored in the data storage 102. FIGS. 2-7 illustrate the creation of the composite indices. FIGS. 2-4 illustrate the creation of the composite input resources index 113. FIGS. 5-7 illustrate the creation of the composite business environment index 114. These figures are further described below. Also, the description of FIGS. 2-7 refers to specific indices by way of example and not limitation. It should be apparent to one of ordinary skill in the art that other indices may be used and applied to the processes described herein.

FIG. 2 is a data flow diagram illustrating the creation of the composite input resources index 113. As indicated above, the composite index creator 103 creates composite indices from various sub-indices stored in the data storage 102. The composite indices, including the composite input resources index 113, are used to generate the county attractive matrix 150 shown in FIG. 1. FIG. 2 shows the data storage 102 and the composite index creator 103 from FIG. 1, which are used to create the composite input resources index 113. The composite input resources index 113 includes metrics that can be used to indicate the level of a country's supply of resources, such as mineral resources (or other natural resources), capital and talent. The composite input resources index 113 may be generated from the following sub-indices: the MPW Talent Index 110a, the MPW Natural Resources Index 110b and the MPW Capital Index 110c. In FIG. 2, the composite index creator 103 retrieves the MPW Talent Index 110a, the MPW Natural Resources Index 110b and the MPW Capital Index 110c from the data storage 102.

Once the sub-indices 110a-c are retrieved from the data storage 102, the composite index creator 103 performs various processes on the sub-indices 110a-c. The processes are shown as eliminating corruption metrics 201 and adding rankings 202. Other processes not shown may be performed by the composite index creator 103.

As described above, the MPW Capital Index 110c is a measure of a country's foreign direct investment flows and capital markets, and includes metrics related to corruption. In order to create the composite input resources index 113, the composite index creator 103 removes or eliminates the corruption metrics, shown as process 201 in FIG. 2, from the MPW Capital Index 110c, thus creating MPW Capital-Non-Corruption Index 112, which may be stored in the data storage 102. This process is further detailed below with reference to FIG. 3.

FIG. 3 illustrates an example of creating the MPW Capital-Non-Corruption Index 112 from the MPW Capital Index 110c. The MPW Capital Index 110c includes sets of metrics 301-304, and a score assigned to each metric for a country (not shown). The metrics 301 indicate whether a country is attractive to foreign direct investments. The metrics 302 indicate whether a country can realize foreign direct investment inflows. The metrics 303 indicate whether a country has high flows of outward foreign direct investments, and the metrics 304 indicate whether a country has sophisticated capital markets. The metrics 301 include a metric related to corruption, i.e. "Corruption rating" metric 310. Of course, any number of corruption metrics may be present in MPW Capital Index 110c.

The eliminating corruption metrics process 201 shown in FIG. 2 is run to remove corruption metrics, i.e. the "Corruption rating" metric 310, from the MPW Capital Index 110c to generate the MPW Capital-Non-Corruption Index 112. Thus, the resulting MPW Capital-Non-Corruption Index 112 does not include any corruption metrics, including "Corruption rating" 310, as shown in FIG. 3. Moreover, the score (not shown) that was assigned to the "Corruption rating" metric 310 in the MPW Capital Index 110c is removed in the MPW Capital-Non-Corruption Index 112 by the process 201. The metrics remaining in the MPW Capital-Non-Corruption Index 112 are then re-scored. For example, the metrics in MPW Capital Index 110c each have an individual score and are thus a percentage of the whole. For instance, in the set of metrics 301, a "GDP (% real change pa)" metric is listed with an individual score of 5, a "Happiness index—Quality of life" metric is listed with an individual score of 10, a "Property rights" metric is listed with an individual score of 5, a "Corruption rating" metric is listed with an individual score of 7, a "No. of instances of blocking foreign investment in the past 5-10 yrs" metric is listed with an individual score of 8, and a "Most attractive location for foreign direct investment" metric is listed with an individual score of 5. The total possible score of the set of metrics 301 is 40 when each of the individual scores for the metrics in the set of metrics 301 are summed. Thus, out of 100%, or a score of 40, the "GDP (% real change pa)" metric has 12.5% of the whole, the "Happiness index—Quality of life" metric has 25% of the whole, the "Property rights" metric has 12.5% of the whole, the "Corruption rating" metric has 17.5% of the whole, the "No. of instances of blocking foreign investment in the past 5-10 yrs" metric has 20% of the whole and the "Most attractive location for foreign direct investment" metric has 12.5% of the whole, totaling 100%. If the "Corruption rating" metric 310 is removed, each of the percentages and scores are increased in proportion to their original percentage until the percentage is 100% again. More specifically, all other metrics in the set of metrics 301 are increased in direct proportion to their original percentage so that the total is 100% again. The MPW Capital-Non-Corruption Index 112 is then stored in the data storage 102.

Referring back to FIG. 2, after running the eliminating corruption metrics process 201 to create the MPW Capital-Non-Corruption Index 112, the adding rankings process 202 is performed to create the composite input resources index 113. The three sub-indices used to generate the composite input resources index 113 may include the MPW Talent Index 110a, the MPW Natural Resources Index 110b and the MPW Capital-Non-Corruption Index 112. These sub-indices may be based on the same set of countries (e.g., the same set of 60 countries) and provide a score or value for each metric in the sub-index for each country and an overall ranking for each country. The composite input resources index 113 may provide an overall ranking for the same set of countries.

FIG. 4 illustrates the "Adding Rankings" process 202 of FIG. 2 in which the overall rankings are added to create the composite input resources index 113. To create the composite input resources index 113, the composite index creator 103 adds the overall ranking from each of the sub-indices, i.e. the MPW Talent Index 110a, the MPW Natural Resources Index 110b and the MPW Capital-Non-Corruption Index 112, for each country. The summation generates a composite ranking for each country within the composite input resources index 113. For example, Argentina has a ranking of 39 in the MPW Talent Index 110a, a ranking of 32 in the MPW Natural Resources Index 110b, and a ranking of 49 in the MPW Capital-Non-Corruption Index 112. In order to determine its composite ranking, the individual rankings, 39, 32, and 49, are summed. Thus, the sum of 39, 32 and 49 is 120 which is the composite ranking for Argentina in the composite input resources index 113. A similar calculation is performed for each country in the set. The composite input resources index 113 is then saved in the data storage 102.

FIG. 5 is a data flow diagram illustrating the creation of the composite business environment index 114. As indicated above, the composite index creator 103 creates composite indices from various sub-indices stored in the data storage 102. The composite indices, including the composite business environment index 114, are used to generate the county attractive matrix 150 shown in FIG. 1. FIG. 5 includes the data storage 102 and the composite index creator 103 from FIG. 1. The composite business environment index 114 includes metrics that can be used to determine where to set up and run a new business while avoiding or minimizing corrupt practices. As shown in FIG. 5, the composite index creator 103 may create the composite business environment index 114 from the following sub-indices: the World Ease of Doing Business Index 111a and the Transparency Internationals' Corruption Perception Index 111b. In FIG. 5, the composite index creator 103 retrieves the World Ease of Doing Business Index 111a and the Transparency Internationals' Corruption Perception Index 111b from the data storage 102.

Since the World Ease of Doing Business Index 111a and the Transparency Internationals' Corruption Perception Index 111b are non-MPW indices, each is based on a variable number of countries, instead of the same sixty countries as the MPW indices. For example, the World Ease of Doing Business Index 111a may be based on eighty countries while the Transparency Internationals' Corruption Perception Index 111b may be based on one hundred countries. Therefore, the composite index creator 103 rebases the indices to include the same set of countries used in the MPW indices 110 and the composite input resources index 113, shown as process 501 in FIG. 5.

FIG. 6 illustrates an example of rebasing non-MPW indices. In FIG. 6, index 610 is an example of a non-MPW index in which more than sixty countries are ranked based on metrics, though only a partial list of the countries is shown in index 610. The composite index creator 103 determines the rankings from index 610 for the same countries that are in the MPW indices 110. The countries in the index 620, which are now the same in number as the MPW indices 110, are then re-ranked by using the ranks from the index 610 and by eliminate gaps in rankings resulting from eliminated countries. For example, Australia is ranked 15th in the index 610. However, one of the top 15 countries, e.g. Hong Kong, is not included in the 60 countries of the MPW indices 110. Thus, all countries ranked below Hong Kong in the index 610 are moved up in ranking by one, and Australia's ranking is changed to 14th assuming it was ranked below Hong Kong in the index 610. The same procedure is performed for each eliminated country. For example, all countries not used in the index 620 are removed from the index 610. Then, gaps in ranking are identified resulting from the eliminated countries. Then, the ranking for each country below a gap is increased based on the size of the gap (e.g., increased by 1 if the gap is for one country that was removed; increased by 2 if the gap is for two countries that were removed, etc.). Note that the 60 countries of the index 620 are a subset of all the countries in the index 610, so a ranking is determinable for each of the 60 countries in the index 620 from the rankings in the index 610.

Returning to FIG. 5, once the World Ease of Doing Business Index 111a and the Transparency Internationals' Corruption Perception Index 111b have been rebased, according to process 501, to generate the rebased indices 510, the rebased indices 510 are then saved in the data storage 102. The composite index creator 103 then adds the overall ranking from each of the constituent sub-indices 111a and 111b for each country, shown as the "Adding Rankings" process 502, thus creating a composite ranking for each country within the composite business environment index 114.

FIG. 7 illustrates the process of adding rankings 502 to determine the composite rankings in the composite business environment index 114. FIG. 7 includes rebased World Ease of Doing Business Index 510a, rebased Transparency Internationals' Corruption Perception Index 510b and composite business environment index 114. To create the composite business environment index 114, the rankings of each of the constituent sub-indices are summed for each country. For example, Argentina has a ranking of 47 in the rebased World Ease of Doing Business Index 510a and a ranking of 48 in the rebased Transparency Internationals' Corruption Perception Index 510b. The composite index creator 103 adds the constituent rankings 47 and 48 to determine the composite ranking for Argentina, 95, in the composite business environment index 114. Similar calculations are performed for each country. The composite business environment index 114 is then saved in the data storage 102.

FIG. 8a illustrates an example of rankings in indices and FIG. 8b illustrates an example of the country attractiveness matrix 150 produced by the matrix generator 105 based on the rankings in FIG. 8a. In the country attractiveness matrix 150, shown in FIG. 8b, sixteen emerging markets of the sixty MPW countries are represented in the matrix. However, in the country attractiveness matrix 150, any number of emerging markets out of the sixty countries may be represented on the country attractive matrix 150. The country attractiveness matrix 150 indicates a level of optimality for each of the countries based on the scores in the selected indices.

The country attractiveness matrix 150 plots the ranking of a country in the first index determined by the mapping engine 104, such as the ranking of each country in the composite business environment index 114 shown in column 810 of FIG. 8a, against the ranking of the country in the second index, such as the composite input resources index 113 shown in column 820 of FIG. 8a for each country. The plotting is determined by splitting the countries into three categories for each index, based on the ranking of the country. For example, the three categories are determined based on a 45/30/25 split of the rankings in columns 810 and 820. Note that these percentages have been selected to counterbalance the natural bias of the underlying rankings towards the developed nations thus given more discrimination among developing countries. Of course a traditional ⅓:⅓:⅓ split, or any other percentage split, can be used as well.

Thus, for the composite input resources index 113 shown in column 820 and on the x-axis of the country attractiveness matrix 150, the countries have been split into the following three categories: "low" representing the bottom 25% index ranking, "average" representing the middle 30% index ranking, and "high" representing the top 45% index ranking. In this example, the composite ranking is out of 180, and thus, the bottom 25% includes countries ranked 136-180, the middle 30% includes countries ranked 82-135 and the top 45% includes countries ranked 1-81.

For the composite business environment index 114 shown in column 810 and on the y-axis of the country attractiveness matrix 150, the countries have been split into the following three categories: "good" representing the top 45% index ranking, "average" representing the middle 30% index ranking, and "poor" representing the bottom 25% index ranking. In this example, the composite ranking is out of 120, and thus, the bottom 25% includes countries ranked 91-120, the middle 30% includes countries ranked 55-90 and the top 45% includes countries ranked 1-54.

Based upon the 45/30/25 split, each country is plotted in the country attractiveness matrix 150. For example, Singapore has a composite ranking of 27 in the composite input resources index 113, column 820, which is considered "high". Singapore also has a composite ranking of 4 in the composite business environment index, column 810, which is considered "good". Thus, Singapore is plotted at the point at which on the x-axis, Singapore is in the "high" column, and on the y-axis, Singapore is in the "good" row, or the intersection of the two points.

Therefore, the country attractiveness matrix 150 indicates a level of optimality for each of the emerging markets, the level of optimality indicating a measure of success in achieving the specified business function. The measure of success may include an estimation of successfully achieving the specified business function in the location. For example, Malaysia and Singapore which earned a "good" and a "high" ranking may achieve a high level of optimality, as opposed to the lowest scoring countries including Indonesia and Nigeria, which earned a "poor" and a "low" ranking according to the country attractiveness matrix 150, which may achieve a low level of optimality.

Figure 9:
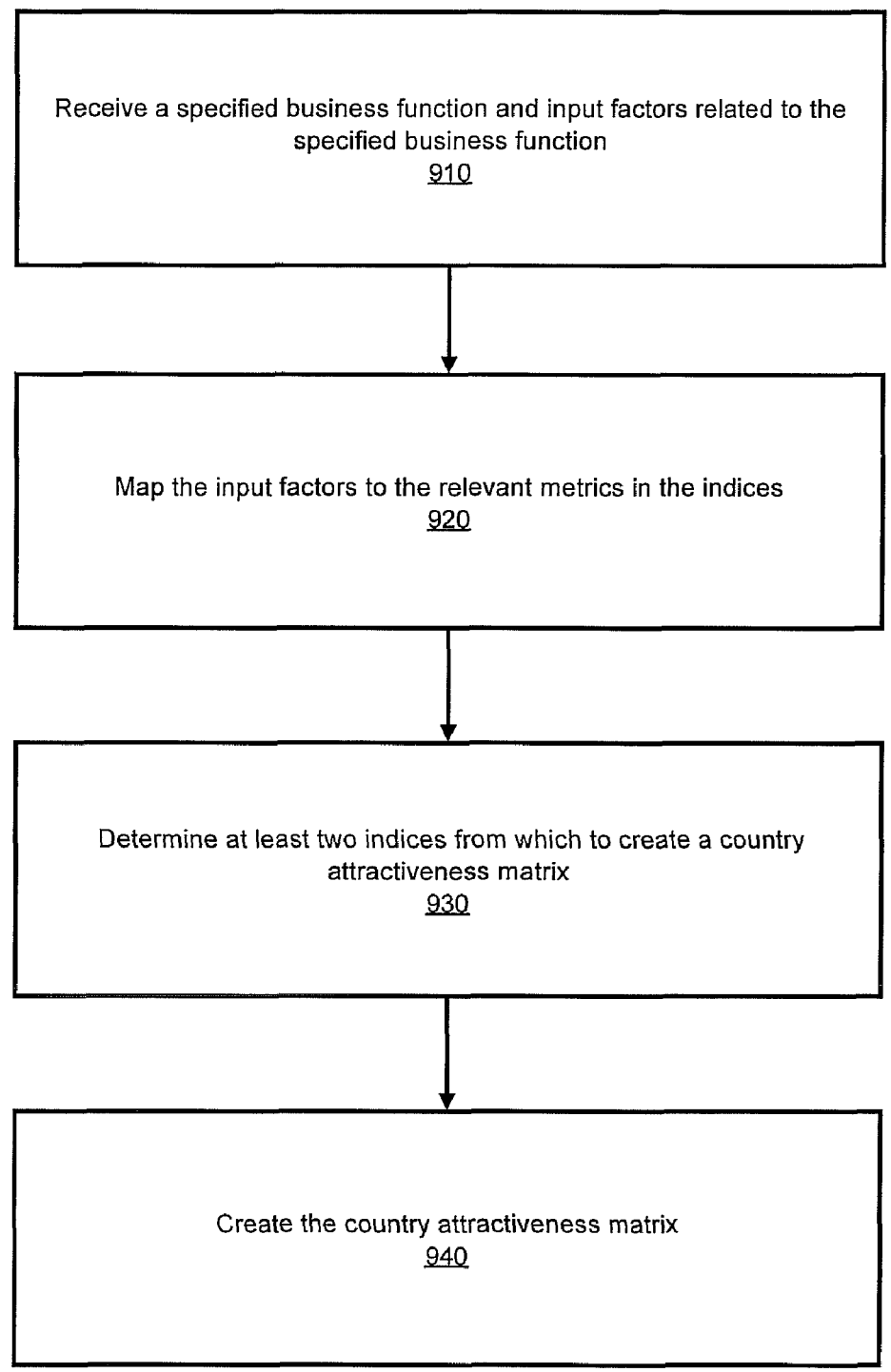
FIG. 9 illustrates a method, according to an embodiment.

FIG. 9 illustrates an emerging markets scoring method 900. The method 900 is described with respect to the FIGS. 1-8 by way of example and not limitation. Other indices and systems may be used to perform the method 900. In step 910 of the emerging markets scoring method 900, the emerging markets scoring system 100 receives a specified business function and input factors from a user that inputs or selects a specified business function and input factors related to the specified business function through the interface 101 of the emerging markets scoring system 100. The interface 101 may be a user interface, such as a graphical user interface (GUI), that receives the specified business function selection or input from the user. The specified business function is a set of actions an entity desires to perform in a specific location, such as a particular country. The specified business function may be related to starting a business unit of the entity, such as research and development (R&D), manufacturing, sales or outsourcing, in the specific location. The input factors related to the specific business function, for example, are business requirements. For example, if an R&D specified business function is chosen, a list of input factors related to the R&D specified business function may include a location supported for innovation, government incentives, skilled work force, infrastructure, etc.

In step 920, the mapping engine 104 of FIG. 1 maps the input factors to the relevant metrics in the indices stored in data storage 102. For example, the mapping engine 104 receives the specified business function and input factors related to the specified business function selections from the interface 101. The mapping engine 104 determines which of the indices in the data storage 102 map to the input factors by mapping each of the input factors to a relevant metric in one of the indices in the data storage 102. The mapping may include matching performed by text search. For each input factor, the mapping engine 104 determines the closest matching text of text of a plurality of metrics in various indices.

In step 930, the mapping engine 104 determines at least two indices from which to create the country attractiveness matrix 150. Once the mapping engine 104 maps the input factors to the relevant metrics in order to analyze the relevant regional, country and economic data for the specified business function, the two indices that have the highest number of input factors mapped to its metrics are selected to create a country attractiveness matrix 150. These two selected indices, specified business function and input factors are then provided to the matrix generator 105. More than two indices may be selected and used to create the country attractiveness matrix 150.

In step 940, the matrix generator 105 of FIG. 1 creates the country attractiveness matrix 150. For example, as described above with reference to FIG. 8b, the country attractiveness matrix 150 may be a 3×3 matrix created by plotting the rankings of the countries based on each of the two indices. Based on the country attractiveness matrix 150, the user determines the optimal emerging markets for the specified business function and inputs factors. A matrix can be any representation of the data calculated and produced by matrix generator 105 including graphs, charts, tables, a 2×2 array, etc.

One or more of the steps and functions described herein and one or more of the components of the systems described herein may be implemented as computer code stored on a computer readable storage device, such as memory or another type of storage device. The computer code is executed on a computer system, for example, by a processor, application-specific integrated circuit (ASIC), or other type of circuit. The code may exist as software program(s) comprised of program instructions in source code, object code, executable code or other formats.

FIG. 10 shows a computer system 1000 that may be used as a hardware platform for the system 100. The computer system 1000 may be used as a platform for executing one or more of the steps, methods, and functions described herein that may be embodied as software stored on one or more computer readable storage devices, which are hardware storage devices.

The computer system 1000 includes a processor 1002 or processing circuitry that may implement or execute software instructions performing some or all of the methods, functions and other steps described herein. Commands and data from the processor 1002 are communicated over a communication bus 1004. The computer system 1000 also includes a computer readable storage device 1003, such as random access memory (RAM), where the software and data for processor 1002 may reside during runtime. The storage device 1003 may also include non-volatile data storage. The computer system 1000 may include a network interface 1005 for connecting to a network. It will be apparent to one of ordinary skill in the art that other known electronic components may be added or substituted in the computer system 1000.

While the embodiments have been described with reference to examples, those skilled in the art will be able to make various modifications to the described embodiments without departing from the scope of the claimed embodiments. Furthermore, the system and methods described herein are generally described with respect to an emerging markets scoring tool. However, the system and methods are applicable to scoring other types of data.

What is claimed is:

1. A system for determining a level of optimality for countries in which to perform a specified business function, the system comprising:
    a data storage to store a composite business environment index, a composite input resources index, and an innovation index;
    a composite index creator to receive a capital index that is a measure of a country's foreign direct investment flows and capital markets and is scored using metrics that include a corruption metric, the composite index creator to remove the corruption metric from the capital index and rescore remaining metrics to create a non-corruption index, wherein the composite index creator is to generate the composite input resources index from a talent index, a natural resource index and the non-corruption index;

a mapping engine to receive the specified business function and input factors related to the specified business function and to select at least two of the composite business environment index, the composite input resources index, and the innovation index based on the input factors; and a matrix generator to determine, by a processor, a level of optimality for each of the countries based on scores in the at least two selected indices, wherein the level of optimality indicates a measure of success in achieving the specified business function, and wherein the matrix generator is to:

determine a first value for each of the countries from a first selected index of the at least two selected indices;

determine a second value for each of the countries from a second selected index of the at least two selected indices; and generate a country attractiveness matrix to determine the level of optimality for each country, wherein the country attractiveness matrix depicts the first and second values on an x-y plane.

2. The system of claim 1, wherein the first value for each country falls in one of three levels, and each level comprises a non-overlapping range of values and the second value for each country falls in one of three levels, and each level comprises a non-overlapping range of values.

3. The system of claim 1, wherein the composite business environment index is created from a plurality of indices, each of the plurality of indices being based on a number of countries different from each of the other indices, and the composite index creator is to:

rebase the plurality of indices to include a same set of countries used in the composite input resource index; and sum rankings for the rebased indices to create the composite business environment index.

4. A method for determining a level of optimality for a number of countries in which to perform a specified business function, the method comprising:

determining the specified business function;

determining input factors related to the specified business function;

creating a composite business environment index from a business index describing ease of doing business in countries and a corruption perception index describing corruption in the countries, wherein the composite business environment index includes a business environment score for each of the countries;

receiving a capital index that is a measure of a country's foreign direct investment flows and capital markets, the capital index scored using metrics that include a corruption metric;

creating a capital non-corruption index by removing the corruption metric from the capital index and rescoring remaining metrics in the capital non-corruption index to account for the removed corruption metric;

creating a composite input resources index from a talent index describing human work force talent in the countries, a natural resources index describing natural resources in the countries, and the capital non-corruption index, wherein the composite input resources index includes a resources score for each of the countries;

determining an innovation index describing a measure of environment for and success at creating innovations in the countries, wherein the innovation index includes an innovation score for each of the countries;

selecting at least two of the composite business environment index, the composite input resources index, and the innovation index based on the input factors; and determining a first value score for each of the countries from a first selected index of the at least two selected indices;

determining a second value score for each of the countries from a second selected index of the at least two selected indices; and generating a country attractiveness matrix for determining the level of optimality for each country, wherein the country attractiveness matrix depicts the first and second score values on an x-y plane;

determining, by a processor, the level of optimality for each of the countries based on the scores of the first and second selected indices, wherein the level of optimality indicates a measure of success in achieving the specified business function.

5. The method of claim 4, wherein the first value score for each country falls in one of three levels, and each level comprises a non-overlapping range of values.

6. The method of claim 5, wherein the three levels comprise good, average and poor.

7. The method of claim 6, wherein good is a top 45% of the first value score, average is a middle 30% of the first value score, and poor is a bottom 25% of the first value score.

8. The method of claim 4, wherein the second value score for each country falls in one of three levels, and each level comprises a non-overlapping range of values.

9. The method of claim 8, wherein the three levels comprise high, average and low.

10. The method of claim 9, wherein high is a top 45% of the second value score, average is a middle 30% of the second value score, and low is a bottom 25% of the second value score.

11. The method of claim 4, wherein the number of countries that form the business index, the corruption perception index, and the composite input resource index are different from each other, and creating the composite business environment index comprises:

rebasing the business index and the corruption perception index to include a same set of countries used in the composite input resource index; and summing the recalculated rankings for the rebased business and corruption perception indices per country.

12. The method of claim 4, wherein the specified business function comprises at least one of research and development, manufacturing, sales, and outsourcing.

13. A computer readable storage device having stored thereon a computer executable program for determining a level of optimality for countries in which to perform a specified business function, the computer executable program when executed causes a computer system to:

determine the specified business function;

determine input factors related to the specified business function;

create a plurality of composite indices from a plurality of sub-indices wherein each of the composite indices and sub-indices include metrics scored across a number of countries, the composite indices including a composite business environment index and a composite input resources index for each of the countries, the composite input resources index being based on a talent index describing human work force talent in the countries, a natural resources index describing natural resources in the countries, and a capital index scored on metrics describing foreign direct investment flows, capital markets in the countries, and a corruption metric;

remove the corruption metric from the capital index to create a capital non-corruption index;

rescore remaining metrics in the capital non-corruption index based on the removed corruption metric;

map the input factors related to the specified business function to the metrics in the composite indices and sub-indices;

select at least two indices from the plurality of composite indices and sub-indices based on the mapping; and determining a first value score for each of the countries from a first selected index of the at least two selected indices;

determining a second value score for each of the countries from a second selected index of the at least two selected indices; and generating a country attractiveness matrix for determining the level of optimality for each country, wherein the country attractiveness matrix depicts the first and second score values on an x-y plane;

determine the level of optimality for each of the countries based on the scores of the first and second selected indices, wherein the level of optimality indicates a measure of success in achieving the specified business function.

14. The computer readable storage device of claim 13, wherein the creating of composite indices includes at least composite business environment index from a business index describing ease of doing business in countries.

15. The computer readable storage device of claim 13, wherein to create the composite business environment index, the computer executable program is to:

rescore the sub-indices of the composite business environment index based on the number of countries forming the composite input resources index composite business environment index; and sum rankings for the rebased sub-indices to create the composite business environment index.

* * * * *